US009242196B2

(12) United States Patent
Abayev et al.

(10) Patent No.: US 9,242,196 B2
(45) Date of Patent: Jan. 26, 2016

(54) METHOD AND DEVICE FOR PURIFYING FLUID MEDIA BY REMOVAL OF CONTAMINATING MULTICOMPONENT INGREDIENTS

(76) Inventors: Alexandr Dzakhotovich Abayev, Vladikavkaz (RU); Marina Alexandrovna Abayeva, Vladikavkaz (RU); Taymuraz Khadzhismelovich Kokoyti, Moscow (RU)

( * ) Notice: Subject to any disclaimer, the term of this patent is extended or adjusted under 35 U.S.C. 154(b) by 6 days.

(21) Appl. No.: 14/349,673

(22) PCT Filed: Jul. 9, 2012

(86) PCT No.: PCT/RU2012/000553
§ 371 (c)(1),
(2), (4) Date: Apr. 4, 2014

(87) PCT Pub. No.: WO2013/081491
PCT Pub. Date: Jun. 6, 2013

(65) Prior Publication Data
US 2014/0238239 A1   Aug. 28, 2014

(30) Foreign Application Priority Data
Dec. 2, 2011 (EA) .................................. 201200796

(51) Int. Cl.
*B01D 45/12* (2006.01)
*B01D 45/16* (2006.01)
(Continued)

(52) U.S. Cl.
CPC ............... *B01D 45/16* (2013.01); *B01D 45/08* (2013.01); *B01D 45/12* (2013.01); *B01D 50/002* (2013.01); *B01D 53/24* (2013.01); *B04C 5/13* (2013.01)

(58) Field of Classification Search
CPC ...... B01D 45/16; B01D 45/12; B01D 50/002; B01D 45/08; B01D 53/24; B04C 5/13
USPC ................. 55/428, 447, 457, 459.3, DIG. 19, 55/DIG. 21; 95/271; 96/139, 198, 190, 96/191; 123/198 E; 181/229
See application file for complete search history.

(56) References Cited

U.S. PATENT DOCUMENTS

| | | | | |
|---|---|---|---|---|
| 4,390,351 A | * | 6/1983 | Matsui | B01D 19/0057 210/512.1 |
| 4,927,437 A | * | 5/1990 | Richerson | B01D 45/16 55/349 |

(Continued)

FOREIGN PATENT DOCUMENTS

| | | | |
|---|---|---|---|
| DE | 3504694 A1 * | 8/1986 | ............ F01N 3/0211 |
| FR | 2714310 A | 6/1995 | |

(Continued)

OTHER PUBLICATIONS

International Search Report of PCT/RU2012/000553, mailed Nov. 9, 2012.

*Primary Examiner* — Dung H Bui
(74) *Attorney, Agent, or Firm* — Collard & Roe, P.C.

(57) ABSTRACT

The group of inventions relates to the technology for purifying liquids and gases by removal of contaminating multicomponent ingredients. The device comprises a housing comprising at least one hollow spiral element with a conical shape, with separation openings being formed in at least some of the turns of the spiral element, each of the openings communicating with a corresponding separation chamber. Arranged opposite the separation opening is a nozzle, which is intended for compensating for the mass and centrifugal moment of the fluid medium. A guide element around which a flow passes is mounted on the wall of the nozzle. The cross-sectional area and the radius of each successive turn is selected from the condition for maintaining an estimated value for the centrifugal moment of the substance to be purified. The method consists in that a flow of medium to be purified is spun by the above-described device. Contaminating components in each turn are positioned by coaxial layers. Layer-by-layer removal of the contaminating components via the separation openings is performed. A reduction in the centrifugal moment of the flow to be purified is compensated for by a clean layer of fluid medium being injected. Technical result: as complete purification of fluid media as possible.

12 Claims, 6 Drawing Sheets

(51) Int. Cl.
    *B01D 50/00*     (2006.01)
    *B01D 45/08*     (2006.01)
    *B04C 5/13*     (2006.01)
    *B01D 53/24*     (2006.01)

(56) References Cited

U.S. PATENT DOCUMENTS

| | | | | |
|---|---|---|---|---|
| 5,140,957 | A * | 8/1992 | Walker | F01M 13/04 |
| | | | | 123/198 E |
| 5,314,529 | A * | 5/1994 | Tilton | B01D 45/16 |
| | | | | 96/204 |
| 5,460,147 | A | 10/1995 | Bohl | |
| 6,752,861 | B2 * | 6/2004 | Spinelli | B01D 45/16 |
| | | | | 55/459.3 |
| 8,025,713 | B2 * | 9/2011 | Dou | B01D 19/0057 |
| | | | | 55/459.3 |

FOREIGN PATENT DOCUMENTS

| | | | |
|---|---|---|---|
| GB | 2146922 | A | 5/1985 |
| JP | 55079061 | A * | 6/1980 |
| SU | 639578 | A | 12/1978 |
| SU | 1242244 | A | 7/1986 |
| SU | 1264963 | A1 | 10/1986 |
| SU | 1369764 | A1 | 1/1988 |
| SU | 1745350 | A1 | 7/1992 |

\* cited by examiner

Fig. 5
VIEW D

METHOD AND DEVICE FOR PURIFYING FLUID MEDIA BY REMOVAL OF CONTAMINATING MULTICOMPONENT INGREDIENTS

CROSS REFERENCE TO RELATED APPLICATIONS

This application is the National Stage of PCT/RU2012/000553 filed on Jul. 9, 2012, which claims priority under 35 U.S.C. §119 of Eurasian Application No. 201200796 filed on Dec. 2, 2011, the disclosure of which is incorporated by reference. The international application under PCT article 21(2) was not published in English.

FIELD OF THE INVENTION

The group of inventions relates to the technology of purifying liquids and gases by removal of contaminating multicomponent ingredients and can find application in various branches of industry, in particular such as flour milling or building industries while purifying various wastes.

BACKGROUND OF THE INVENTION

In industrial countries, pollution of the environment is growing proportionally to the rise of production.

To recover some contaminating ingredients from liquids and gases (hereinafter fluids), depending on their properties and those of the fluid media to be purified, use is made of apparatuses with different constructions and operation principles. In most cases, no needed purification degree can be achieved in one apparatus, and one has to purify fluid media in two or more apparatuses placed downstream. Nevertheless, the gas purifying means recover only a part of atmosphere contaminating substances contained in the gases removed from technological units with a gas purification system.

I was established that the whole world yearly rejects into atmosphere more than 200 million tons of carbonic oxide, more than 50 million tons of various hydrocarbons, about 148 million tons of sulfur dioxide, 53 million tons of nitric oxides and other harmful substances (M. Ya. Yudashkin, "Dust collecting and purification of gases in ferrous metallurgy", Moscow, "Metallurgia", 1984, 320 p.).

Similar situation characterizes industrial and domestic sewage.

A trap separator comprising a separation conduit composed of two counter bends is known. The first bend is provided with a regulated aperture through which a coarse fraction is separated under the effect of centrifugal forces to be returned for grinding. In the second bend, additional purification of the gas flow is carried out, the fractions being additionally separated by sizing (specification of USSR author's certificate No. 1369764, Cl. B01D 45/12, published on Jan. 30, 1988).

However, said trap separator is characterized by a very narrow range of solid fractions that it traps from a gas flow, which highly reduces the gas purification degree.

As the closest prior art to the claimed invention is a spiral separator comprising a housing, a spiral separation conduit, the wall outer surface of which presents longitudinal ribs, and a porous screen under the form of tubes in a porous material is arranged between the last (specification of USSR author's certificate No. 1264963, Cl. B01D 45/12, published on Oct. 23, 1986).

The known spiral separator is designed mainly to separate liquids from a gaseous flow.

When the flow to be separated moves in the separation conduit of this known separator, the liquid separated under the effect of centrifugal forces falls onto the walls of tubes, penetrates both into the last and onto the outer surface facing the separation conduit wall and is removed from the separation area via the outer and inner surfaces, as well as via the capillaries of the tube porous material. The longitudinal tubes provide for uniform distribution of the flow in the separation conduit section and for smoothing out cross-sectional fluctuations.

The main drawback of said spiral separator is the narrow range of contaminants removed from the gaseous flow, in the considered case it is only liquid, said range being limited by the size of the porous material capillaries.

SUMMARY OF THE INVENTION

The technical task to be solved by the present invention is to provide the maximum purification degree of fluid media (liquid or gas) to remove contaminating multicomponent ingredients.

The invention solves the objective put forward thanks to the first subject of patenting, in particular: using a device for purifying fluid media by removal of contaminating multicomponent ingredients, comprising a housing composed of at least one hollow spiral element with a conical shape.

At least a part of the spiral element turns present separation openings each of them communicating with a corresponding separation chamber. Arranged opposite a separation opening is a nozzle intended for compensating for the mass and centrifugal moment of the fluid medium, a streamlined guide element being provided on the nozzle wall. The cross-sectional area and the radius of each following turn of at least one spiral element are chosen to observe the condition for maintaining an estimated value for the centrifugal moment of the substance to be purified.

Said guide element is principally made of elastic material and presents, in the cross-section of the same, for example a lens-shape, one of the ends of the same being able to be articulated by a hinge with the wall of said nozzle.

The separation chamber can be provided with absorbing agent neutralizing the contaminating component, and the turn with the separation chamber is equipped with a combined arrangement for controlling and activating separation processes.

At least a part of turns of at least one spiral element can present flow-type arrangements for controlling and activating separation processes.

Said arrangements can be selected from the following range: electrochemical, cavitational, electromagnetic, chemical, vibro-acoustic or from any combination between them.

The cross-sectional area of each turn of at least one spiral element can have a rectangular, triangular or rhomboid shape.

An embodiment of the device is possible as well when the cross-sectional areas of a spiral element have different shapes. For example, the cross-sectional area of the spiral element turns changes from a turn to another from rectangular (at the inlet of fluid media into the device) to triangular or rhomboid, or to a different shape (as the fluid media pass in this device), depending on the tasks to be solved during the purification process.

According to an embodiment of the purifying device, its housing can contain two or more spiral elements which are mounted in parallel-series relative to each other.

According to another embodiment, the technical objective is solved thanks to the implementation of a method for purifying fluid media by removal of contaminating multicomponent ingredients consisting of the fact that a fluid media flow with contaminating multicomponent ingredients is spun by the said device until obtaining an estimated value for the centrifugal moment of the substance to be purified, when the contaminating components are positioned in each turn of at least one spiral element as coaxial layers.

It is necessary to do a reservation that when the contaminating components in each turn of at least one spiral element are positioned in coaxial layers, the spiral turn is made equal to a ring.

The distance of each of said layers to the center of at least one spiral element is proportional to the average molecular (atomic) mass of the contaminating components from a corresponding layer. After that, the contaminating components are removed by layers through separation openings by shifting the centrifugal moment equilibrium of the whole flow to the separation chambers of the device. Resulting decrease of the centrifugal moment for the flow to be purified is compensated by supplying a pure layer of fluid media instead of the removed contaminating component layer.

The separation and sedimentation properties of the fluid media flow, during the passage of the last through the purifying device, can be submitted to electrochemical, cavitational, electromagnetic, chemical, vibro-acoustic activation or to any combination between them.

BRIEF DESCRIPTION OF THE DRAWING

The invention is explained with a drawing where.

EMBODIMENTS OF THE INVENTION

Figure 1:
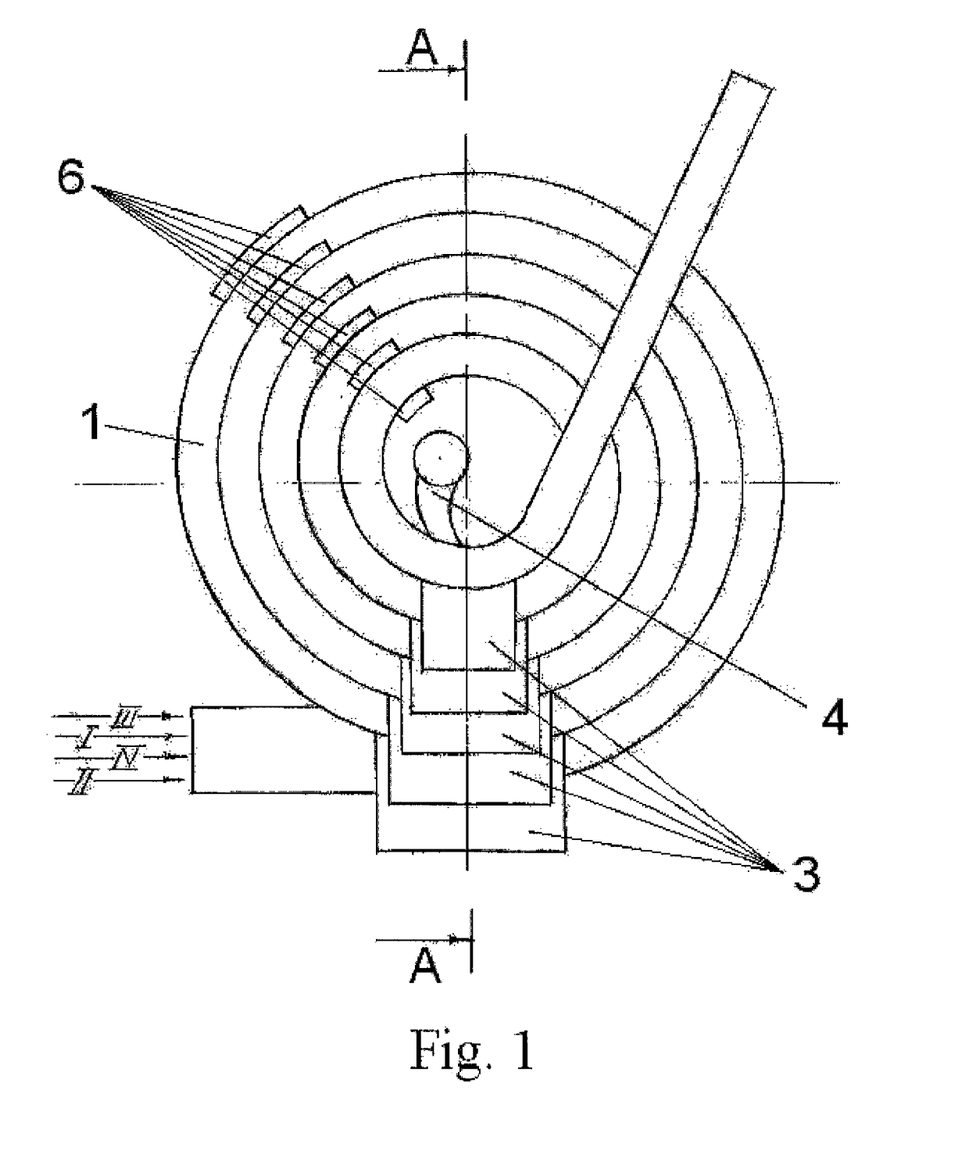
FIG. 1 schematically illustrates a device for purifying fluid media by removal of contaminating multicomponent ingredients.
Figure 2:
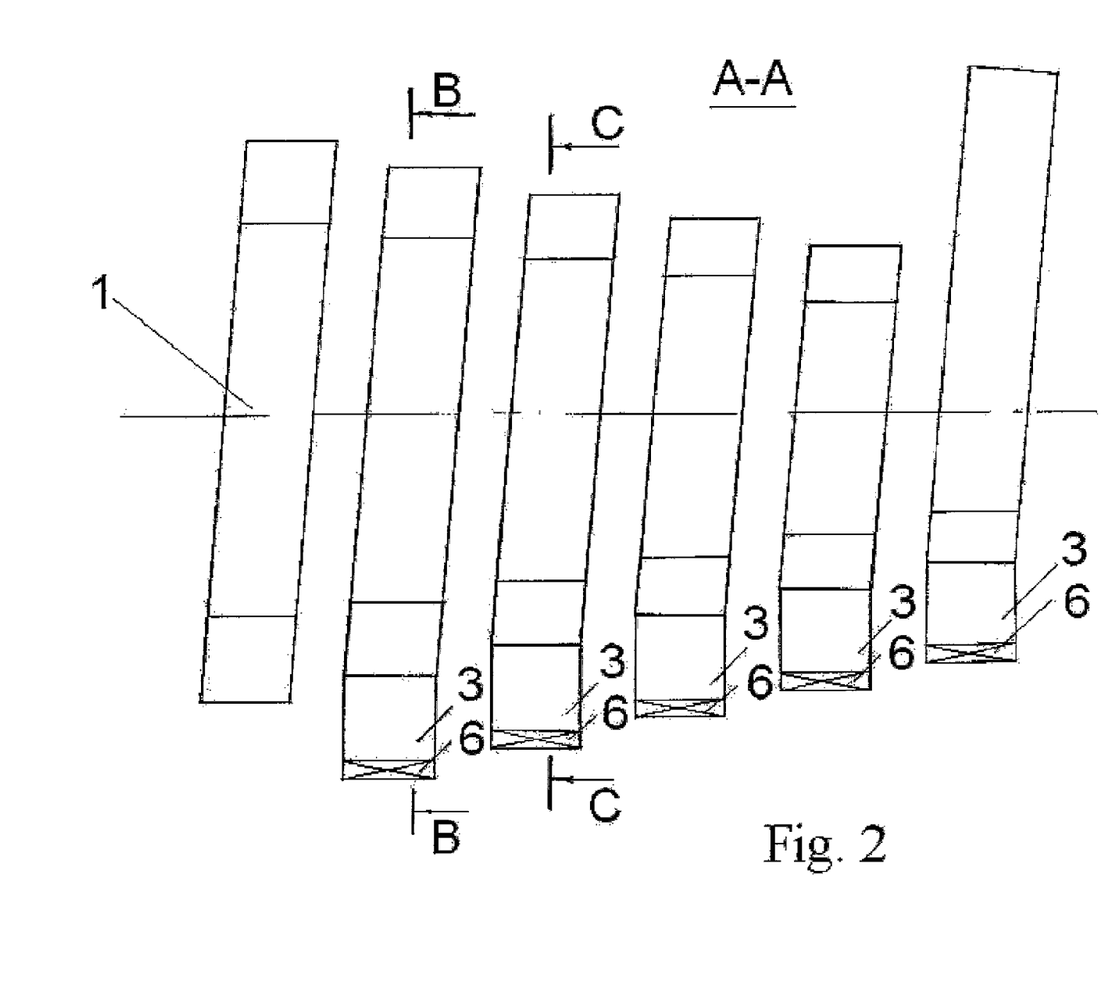
FIG. 2 depicts the A-A section of FIG. 1.

As shown in FIG. 1, the device for purifying fluid media by removal of contaminating multicomponent ingredients comprises a housing composed of at least one hollow spiral element 1 every turn of which presents, for example, a rectangular section and communicates, via a separation opening 2 provided at the outer surface of the same (FIGS. 3, 4), with a corresponding separation chamber 3. A nozzle 4 designed to compensate the mass and the centrifugal moment of the fluid media is provided from the inner side of each coil of the spiral element opposite the corresponding separation opening 2.

Figure 3:
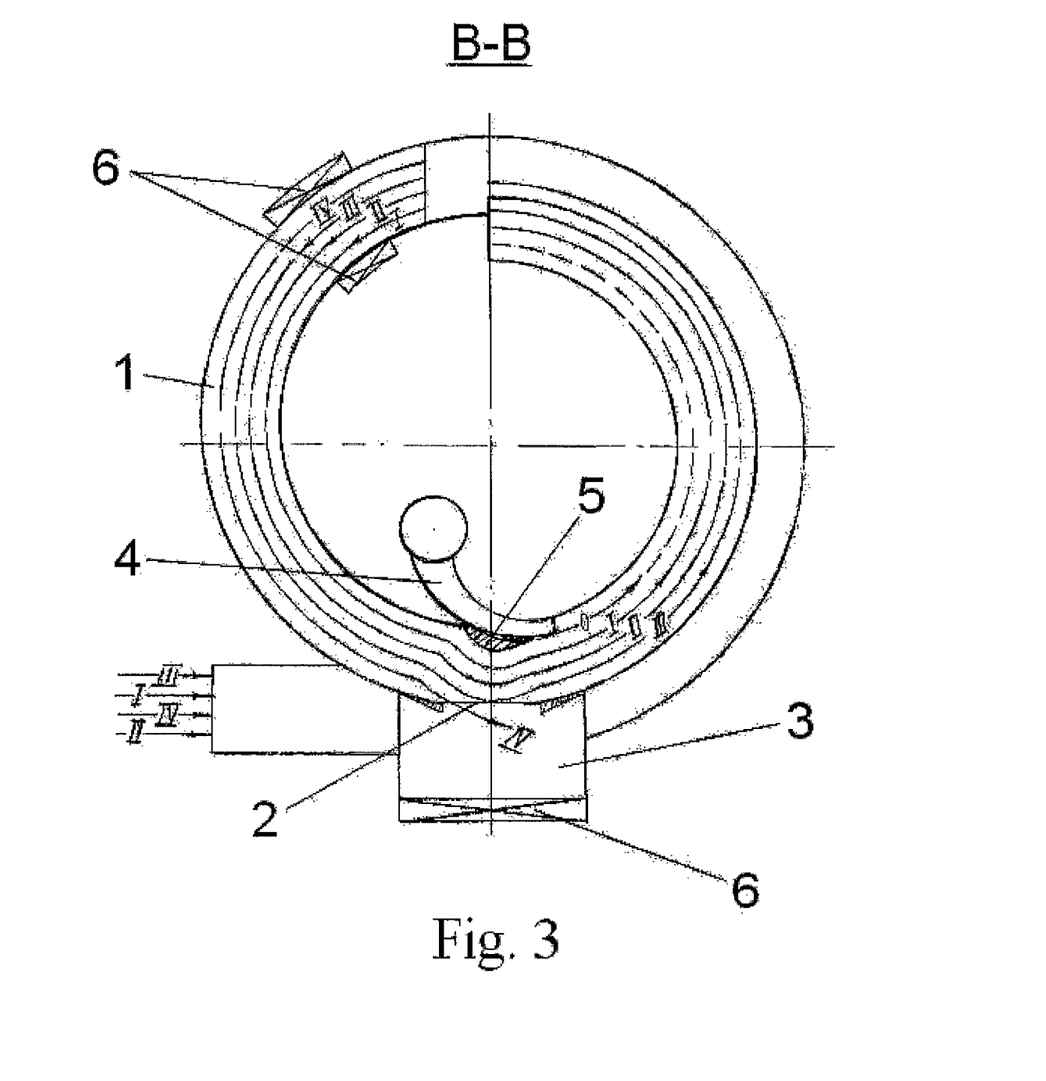
FIG. 3 illustrates the B-B section of FIG. 2.
Figure 4:
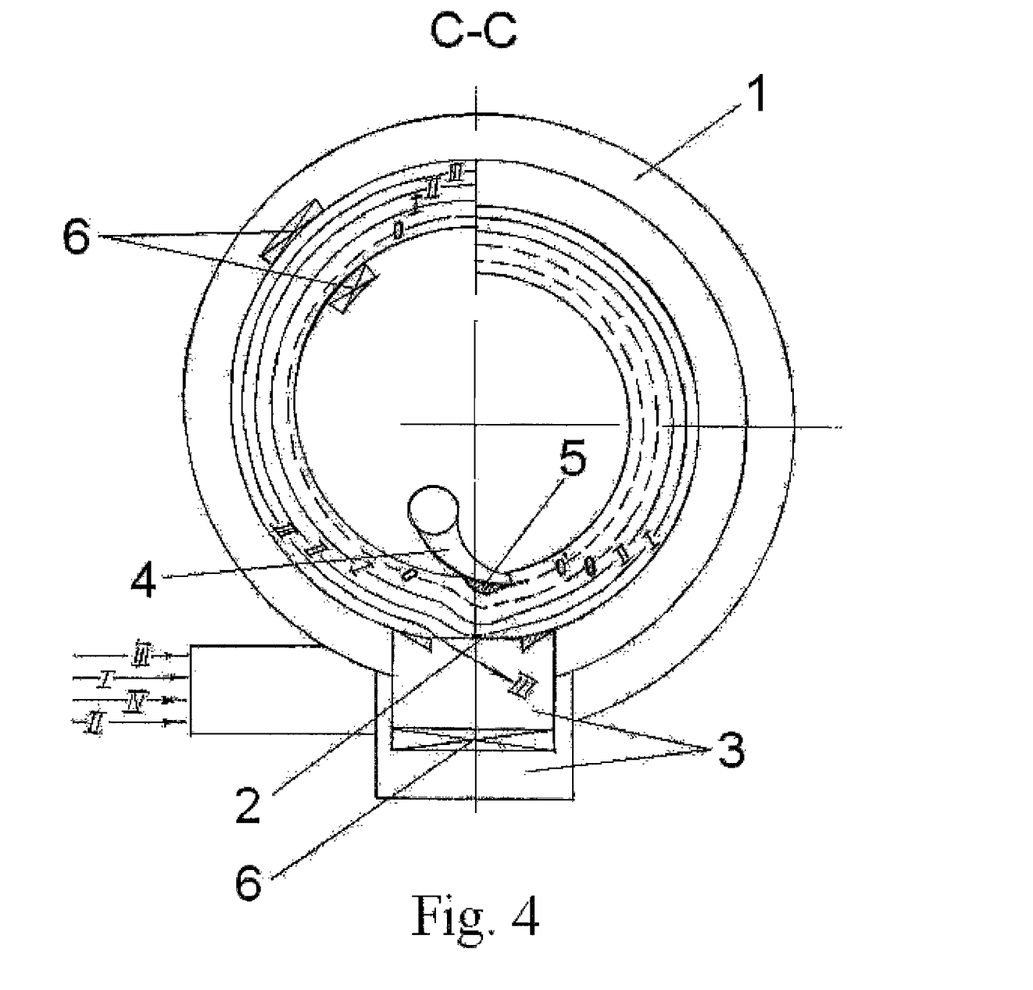
FIG. 4 illustrates the C-C section of FIG. 2.

On the nozzle wall 4 there is mounted, for example, with the help of a hinge, an element 5 guiding the fluid media flow to the separation opening 2 and having a streamlined form, for example such as shown in FIGS. 3 and 4. The size of the element 5, as well as that of the separation opening 2 can be selected according to given parameters of a particular technological purification process, and the cross-sectional area and the radius of each following turn of the spiral element 1 are calculated with the condition to keep constant the calculated value of the centrifugal moment for the substance to be purified.

Each coil of the spiral element 1 presenting a separation chamber 3 is provided with a flow-type arrangement 6 for controlling and activating separation processes, which, depending on the composition of contaminating ingredients, can be electrochemical, cavitational, electromagnetic, chemical or vibro-acoustic. Any other combination of mentioned variants can be carried out.

FIGS. 5, 6 and 7, 8 show two possible embodiments of the purifying device housing. According to the device embodiment of FIGS. 5 and 6, each spiral element has only one turn, and according to FIGS. 7 and 8, several turns, all of them being arranged in parallel-series one to each other.

Figure 5:
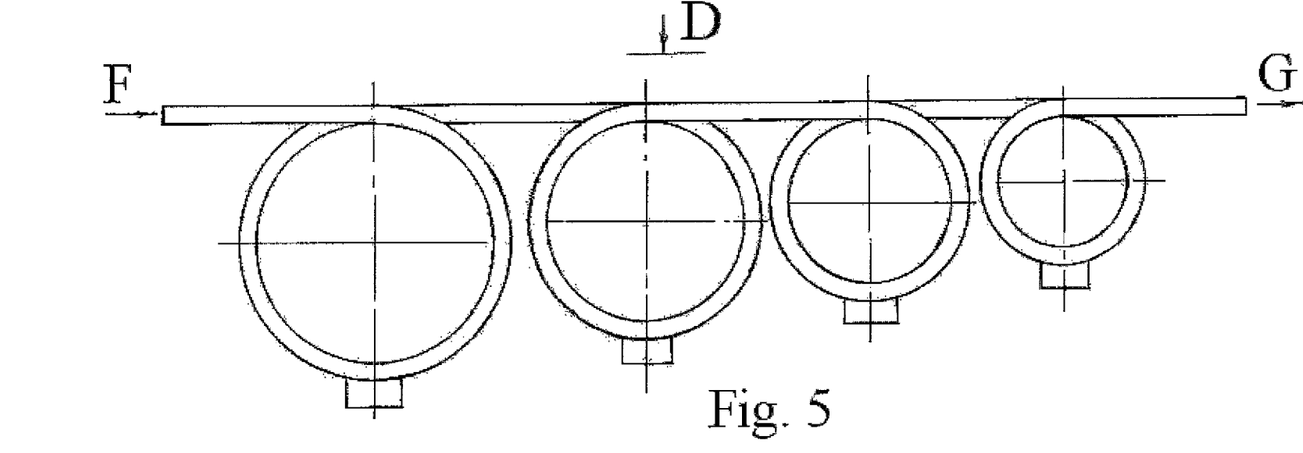
FIG. 5 illustrates an embodiment of the purifying device housing.
Figure 6:
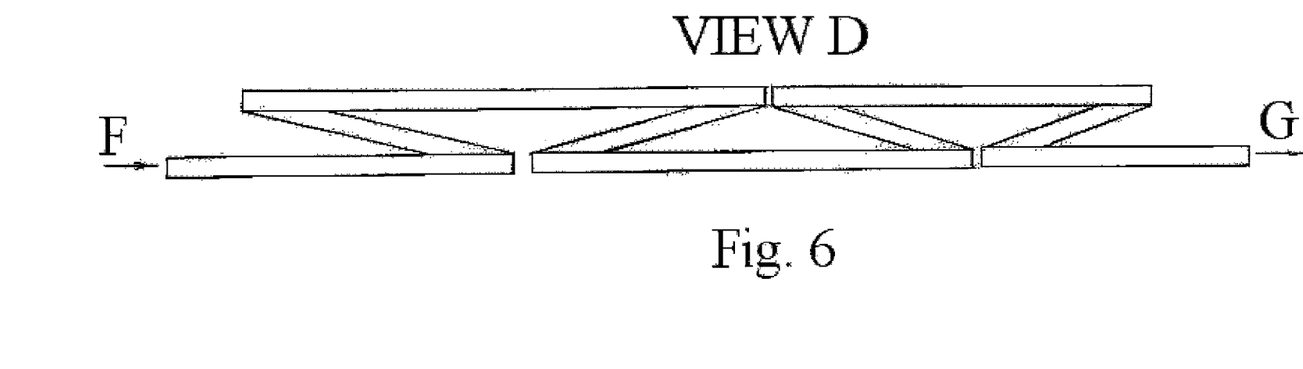
FIG. 6 illustrates the view D of FIG. 5.
Figure 7:
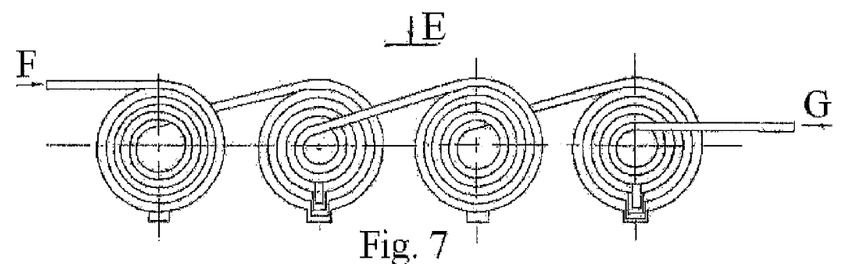
FIG. 7 illustrates another embodiment of the purifying device housing.
Figure 8:
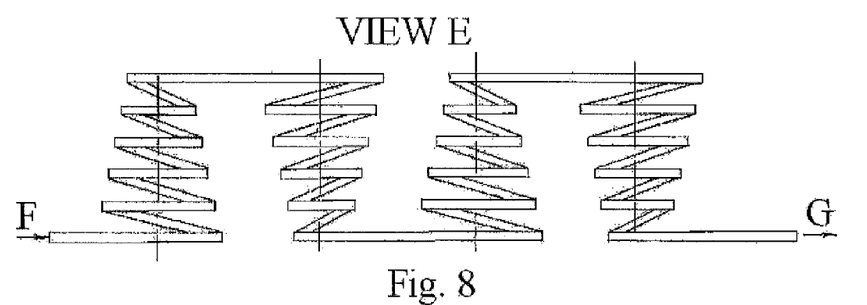
FIG. 8 illustrates the view E of FIG. 7.

The device embodiment shown in FIGS. 5 and 6 can be used for purifying one- or two-component fluid media, essentially gaseous media, for example cement dust, whereas the device embodiment of FIGS. 7 and 8 is more suitable for purifying liquid media.

The arrow F in FIGS. 5 to 8 shows the direction of the flow movement of fluid media contaminated with multicomponent ingredients at the device inlet, the arrow G of these Figures showing the direction of the flow movement of fluid media contaminated with multicomponent ingredients at the device outlet. In particular, in FIGS. 5 and 6, the housing turn diameter decreases in the downstream direction of the fluid media, whereas in FIGS. 7 and 8 the device housing is composed of spiral elements with a conical shape, the turn with the least diameter of one spiral element being linked to a turn of another spiral element, having the maximum diameter.

This phenomenon is explained by the fact that in case of a superfine separation of fluid media having a large number of multicomponents that differ little from each other as to their atomic masses, it is necessary to create a very high centrifugal moment that is obtained, according to physics laws, just at the end of the device, at the turn with the least diameter; nevertheless, due to the fact that the turn is alone, the main flow gets through bypassing the separation chamber.

When designing the device, two embodiments to obtain the required result existed, the first of them proposed to lengthen the spiral element having the least diameter turns until obtaining a complete separation thanks to the centrifugal moment achieved, but it requires considerable energy consumption due to a drastic increase of hydraulic resistance. The second embodiment proposed to introduce back into the accelerating device the flow going out of the spiral element for "breaking" the centrifugal moment achieved and for mixing the coaxially arranged layers, i.e. to restart all the process, which is not economically advantageous either.

To prevent conflicts to appear, the highest centrifugal moment acquired with coaxially structured flows is transmitted practically without losses to a following spiral element that continues the purification process, in other words, the fluid media purification degree increases smoothly, without disturbing the order of the coaxially arranged layers of multicomponent ingredients.

The device is operating as follows.

As to FIGS. 1, 3 and 4, the Roman numerals I; II; III; IV designate flows of contaminating multicomponent ingredients at the device inlet. When a fluid medium to be purified enters the device with a given rate, the mentioned contaminating multicomponent ingredients are distributed chaotically in the whole flow.

While the flow of fluid media to be purified moves under rotation along the spiral element 1 of the device housing, some centrifugal force of an estimated value comes up and provides for the distribution of the contaminating multicomponent ingredients in each turn of the device in coaxial layers I; II; III; IV in conformity with their average molecular masses, and they tend to occupy a position corresponding to the highest radius of the device turn.

However, the centrifugal forces of the coaxial layers of contaminating multicomponent ingredients I; II; III; IV are counterbalanced by the reactive force of the spiral element walls 1 making part of the device housing, which creates a centrifugal moment in the flow of the fluid media to be purified.

Arrived at the separation opening 2, the fluid media flow to be purified looses for a while the effect of the reactive force from the spiral element walls 1 of the housing, which results in the equilibrium loss of the centrifugal moment for the fluid media flow to be purified and in its shift to the separation chamber 3 to provide extrusion of the coaxial layer of the contaminating multicomponent ingredient adjoining the outer wall of the spiral element turn 1 and designated in the Figures by the item IV.

Nevertheless, due to the high inertia of the fluid media flow to be purified, only an insignificant part of contaminating multicomponent ingredients is transferred into the separation chamber 3.

That is why the degree of equilibrium shift of the centrifugal moment in the fluid media flow to be purified in the direction of the separation chamber 3 is regulated by the position and the size of the guide element 5 as well as by the size of the separation opening 2.

Depending on the physicochemical properties of the contaminating multicomponent ingredient, some corresponding kind of adsorbent, absorbent or reactant that neutralize the contaminating multicomponent ingredient are placed in the separation chamber 3, their amount being continuously renewed via a hydraulic seal of a standard structure (not shown).

While removing a layer of contaminating multicomponent ingredient and after its neutralization, some quantity of the momentum and of the fluid media is lost, which reduces the centrifugal moment value for the fluid media flow to be purified. To recover the centrifugal moment of the fluid media flow to be purified to the estimated value, via a nozzle 4 provided at the spiral element inlet, from its inner part, a new layer of fluid media designated in the drawing by the item 0 and imparting an additional impulse to the flow of contaminating multicomponent ingredients is injected (FIG. 3).

The same phenomenon is repeated with the fluid media flow in the following turn of the spiral element 1 of the device housing. Only in this case, the layer III of contaminating ingredient enters the separation chamber 3 to substitute the contaminating ingredient layer IV removed at the previous stage. Instead of the removed layer III, via the respective nozzle 5, a pure layer of fluid media designated in the drawing by the item $0^1$, is injected into this spiral element 1 turn to provide some additional impulse to the flow of contaminating multicomponent ingredients (FIG. 4).

Further, the process is carried out until the complete removal of all the contaminating multicomponent ingredients from the fluid media flow.

In addition, to maintain the estimated value of the centrifugal moment for the fluid media to be purified, the cross-sectional area and the radius of each following turn are calculated depending on the composition of contaminants. In this case, the number of turns is not limited in the device, and it depends as well on the contaminants composition and on the purification degree.

The invention claimed is:

1. Device for purifying fluid media by removal of contaminating multicomponent ingredients, comprising a housing composed of at least one hollow spiral element with a conical shape, at least in a part of spiral element turns, with separation openings being formed, each of said openings communicating with a corresponding separation chamber, and arranged opposite each separation opening is which is intended for compensating the mass and centrifugal moment of the fluid medium, a nozzle wall presenting a streamlined guide element, the cross-sectional area and the radius of each following turn of at least one spiral element being selected with the condition of maintaining an estimated value for the centrifugal moment of the substance to be purified.

2. Device according to claim 1, wherein the guide element is mounted on the nozzle wall with a hinge.

3. Device according to claim 1, wherein the guide element presents a lens-shaped form in the cross-sectional area.

4. Device according to claim 1, wherein each separation chamber is provided with some absorbent neutralizing the contaminating component.

5. Device according to claim 1, wherein at least a part of turns of at least one spiral element is provided with flow-type arrangements to control and to activate the separation processes.

6. Device according to claim 5, wherein said arrangement is selected from the range: electrochemical, cavitational, electromagnetic, chemical, vibro-acoustic or from any combination between them.

7. Device according to claim 1, wherein the cross-sectional area of each turn of at least one spiral element can have a rectangular, triangular or rhomboid shape.

8. Device according to claim 1, wherein the cross-sectional areas of at least one spiral element have different shapes.

9. Device according to claim 1, wherein the housing can contain two or more spiral elements which are mounted in parallel-series relative to each other.

10. Method for purifying fluid media by removal of contaminating multicomponent ingredients wherein a flow of fluid media with contaminating multicomponent ingredients is spun by the device according to claim 1, until reaching an estimated value for the centrifugal moment of the substance to be purified when the contaminating components are positioned as coaxial layers in each turn of at least one spiral element, the distance from each said layer to the center of at least one spiral element being proportional to the average molecular mass of contaminating components in a corresponding layer, after that, the contaminating components are removed via separation openings of the device by shifting the whole flow centrifugal moment equilibrium in the direction of the separation chambers of the device, a reduction in the centrifugal moment of the flow to be purified being compensated for by a clean layer of fluid medium injected to supplant the removed layer of contaminating component.

11. Method according to claim 10, wherein the separation and sedimentation properties of the fluid medium flow are submitted to activation during the process of the passage of the same in the device.

12. Method according to claim 11, wherein said activation is selected from the range: electrochemical, cavitational, electromagnetic, chemical, vibro-acoustic or from any combination between them.

* * * * *